United States Patent
Noguchi

(10) Patent No.: US 8,422,129 B2
(45) Date of Patent: Apr. 16, 2013

(54) APPARATUS FOR MOVING OPTICAL ELEMENTS VIA PLURALITY OF BALLS

(75) Inventor: Kazuhiro Noguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 684 days.

(21) Appl. No.: 12/546,481

(22) Filed: Aug. 24, 2009

(65) Prior Publication Data

US 2010/0053750 A1    Mar. 4, 2010

(30) Foreign Application Priority Data

Aug. 26, 2008 (JP) .................. 2008-216448

(51) Int. Cl.
*G02B 23/00* (2006.01)
(52) U.S. Cl.
USPC ............................ 359/407; 359/375; 359/480
(58) Field of Classification Search .......... 359/399–442, 359/375, 480, 823
See application file for complete search history.

(56) References Cited

U.S. PATENT DOCUMENTS

| | | | | |
|---|---|---|---|---|
| 6,064,827 A | * | 5/2000 | Toyoda ........................... | 396/55 |
| 6,909,545 B2 | * | 6/2005 | Takano et al. .................. | 359/557 |
| 2008/0181594 A1 | * | 7/2008 | Noguchi ......................... | 396/55 |

FOREIGN PATENT DOCUMENTS

| | | |
|---|---|---|
| JP | 50-146562 U | 12/1975 |
| JP | 04-141611 A | 5/1992 |
| JP | 08-086948 A | 4/1996 |
| JP | 10-319325 | 12/1998 |

* cited by examiner

*Primary Examiner* — Thomas K Pham
*Assistant Examiner* — Vipin Patel
(74) *Attorney, Agent, or Firm* — Canon U.S.A., Inc. IP Division

(57) ABSTRACT

An observation apparatus includes a first member 9 supporting first optical elements L1L and L1R, a second member 7 supporting second optical elements L4L and L4R and the first member via balls so as to be movable in an optical axis direction, and a biasing device 11 generating a biasing force for clamping the balls. The first and second members include guide portions 7a, 7b, 9a, and 9b engaging with first balls so as to permit a rolling motion of the two first balls 10a and 10b in the optical axis direction and prevent the first member from displacing with respect to the second member in a direction orthogonal to the optical axis direction, and ball holding portions 7c, 7d, 9c, and 9d holding second balls 10c and 10d so as to permit a rolling motion of the second balls in the optical axis direction.

6 Claims, 15 Drawing Sheets

APPARATUS FOR MOVING OPTICAL ELEMENTS VIA PLURALITY OF BALLS

BACKGROUND OF THE INVENTION

1. Field of the Invention

The present invention relates to an observation apparatus such as a pair of binoculars, and more particularly to an observation apparatus which has a mechanism of moving a part of an observation optical system in an optical axis direction.

2. Description of the Related Art

An observation apparatus such as a pair of binoculars is an optical apparatus which is able to observe an optical image of an object to be observed that an objective optical system forms by enlarging the optical image with an eyepiece optical system. An optical element constituting a part of the objective optical system or the eyepiece optical system moves in an optical axis direction to change an observation magnification or perform a focusing for the object to be observed.

Japanese Patent Laid-Open No. 10-319325 discloses a pair of binoculars which moves a pair of left and right objective lenses integrally attached to an objective mount in an optical axis direction to perform a focusing. The objective mount slides on a convex portion formed at a base of the pair of binoculars. Further, each of two guide members fixed on the base engages with corresponding one of two guide holes, which are formed in the objective mount extending in the optical axis direction and away from each other in the optical axis direction, in a direction orthogonal to the optical axis direction. Thus, the objective mount is guided so as to be movable with respect to the base in the optical axis direction. The objective mount and the base are held by four guide springs in a closely-attached state. Further, a focus screw rotatably held at a fixed position of the base is screwed into a female screw formed in the objective mount, and a pair of objective lenses moves in the optical axis direction by rotating the focus screw.

However, since the pair of binoculars disclosed in Japanese Patent Laid-Open No. 10-319325 has a configuration where a support mechanism and a guide mechanism of the objective mount entirely slide, the drive load is easily higher.

In order to increase a moving amount of the objective lens, it is necessary to lengthen an optical axis direction length of each of the two guide holes for guiding the objective mount in the optical axis direction. However, because a space around the objective mount and the base in the optical axis direction is limited, the gap between the two guide members provided on the base in the optical axis direction has to be narrowed. Since the guide member engages with the guide hole so as to be relatively movable in the optical axis direction, there is a backlash between them. Therefore, when the gap between the two guide members in the optical axis direction is narrowed, the position accuracy is deteriorated in moving the pair of objective lenses and the frictional force acting on a slide portion between the guide member and the guide hole also increases. Furthermore, because each of the focus screw and the female screw is integrally provided in the base and the objective mount, the frictional force on a slide portion between the objective mount and the base increases unless the position accuracy of both screwed portions is high.

BRIEF SUMMARY OF THE INVENTION

The present invention provides an observation apparatus which has a good position accuracy of an optical element movable in an optical axis direction, has a small moving load of the optical element, and further has a configuration suitable for increasing a moving amount of the optical element.

An observation apparatus as one aspect of the present invention includes an observation optical system, a first member configured to support a first optical element constituting a part of the observation optical system, a second member configured to support a second optical element constituting another part of the observation optical system and to support the first member via a plurality of balls so as to be movable in an optical axis direction of the first optical element, and a biasing device configured to generate a biasing force for clamping the plurality of balls between the first member and the second member. The plurality of balls include two first balls disposed at positions away from each other in the optical axis direction and a second ball disposed away from the two first balls in a direction orthogonal to the optical axis direction. The first and second members include two guide portions which are configured to engage with corresponding one of the two first balls so as to permit a rolling motion of the two first balls in the optical axis direction and prevent a displacement of the first member with respect to the second member in the direction orthogonal to the optical axis direction, and a ball holding portion which is configured to hold the second ball so as to permit a rolling motion of the second ball in the optical axis direction.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Embodiment 1

Figure 1:
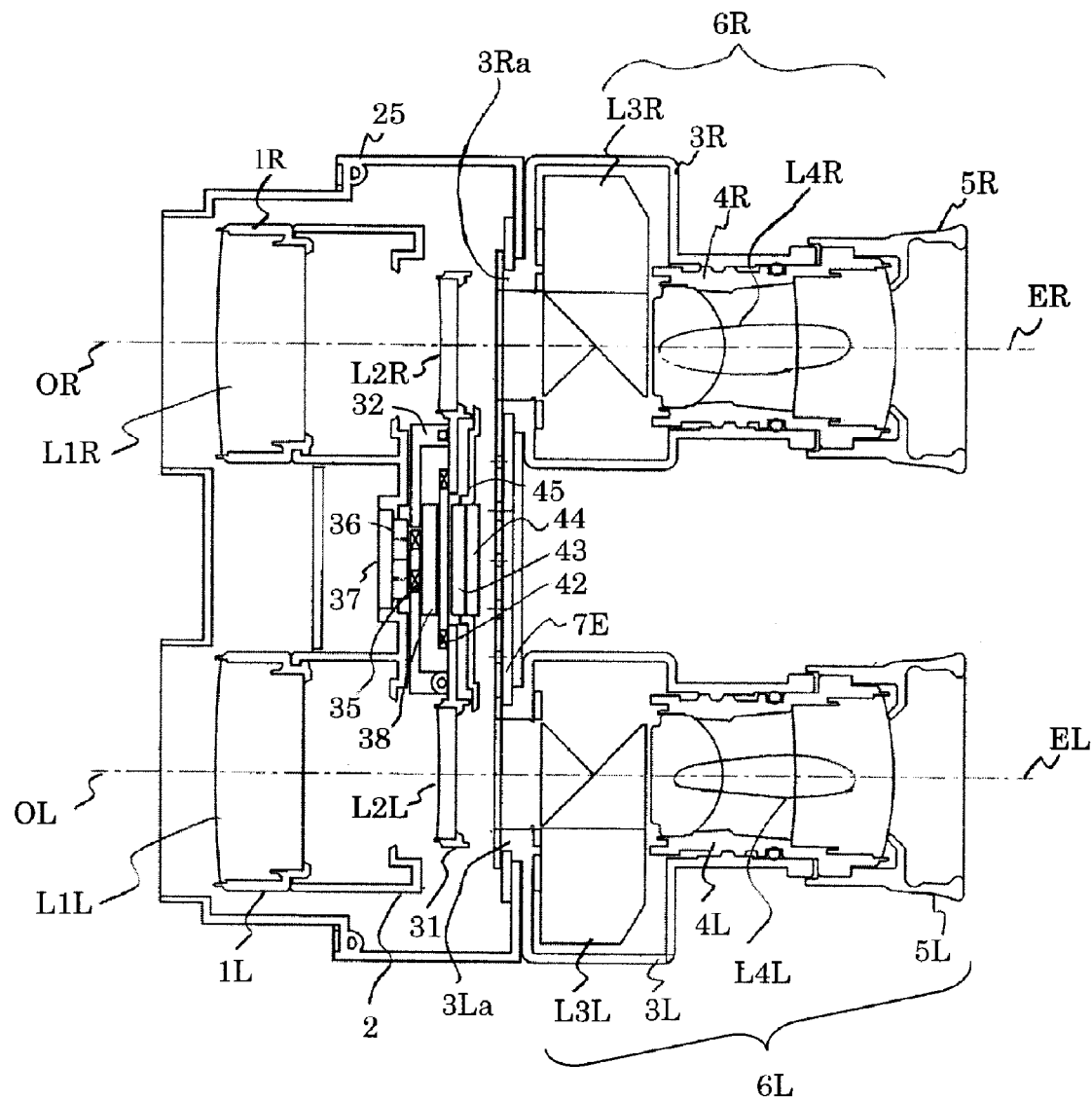
FIG. 1 is a cross-sectional view of a pair of binoculars that is embodiment 1 of the present invention.
Figure 2:
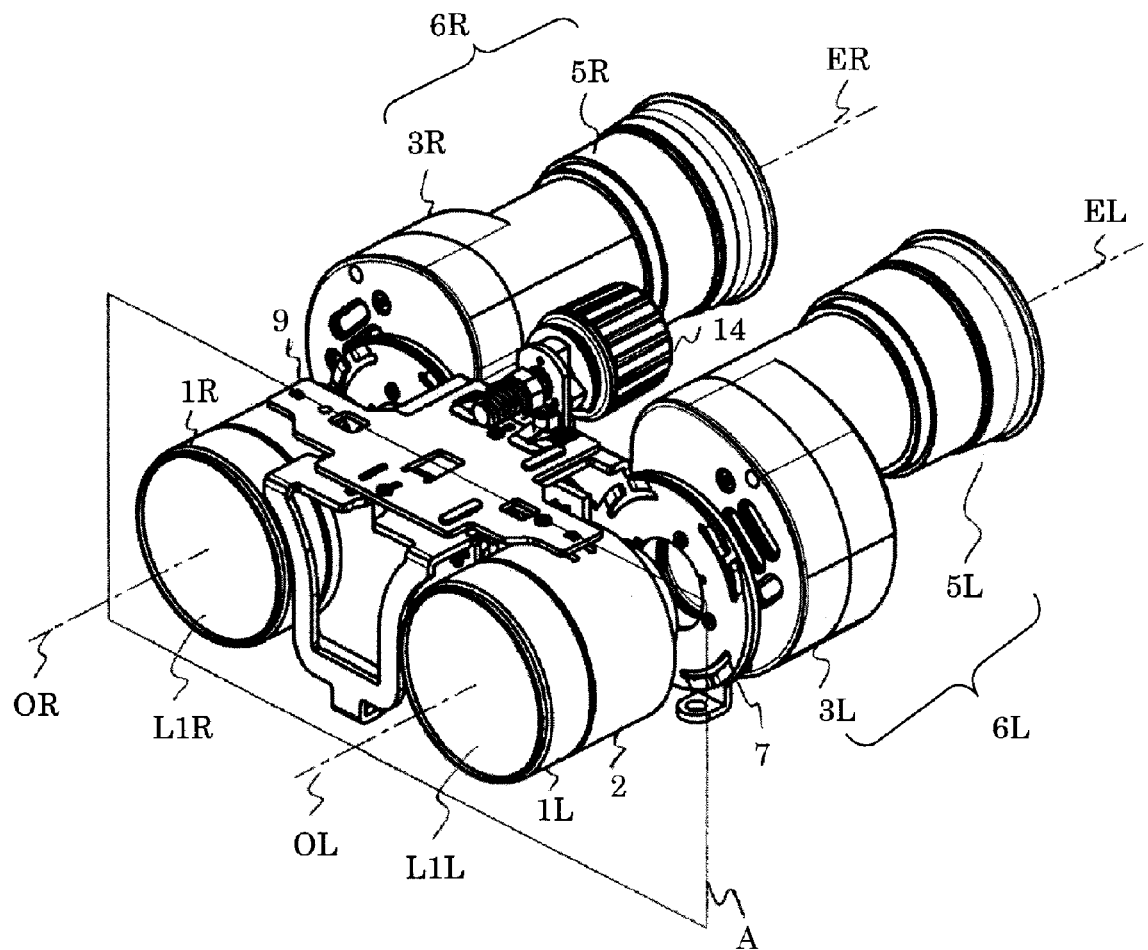
FIG. 2 is a perspective view of a pair of binoculars of embodiment 1.
Figure 3:
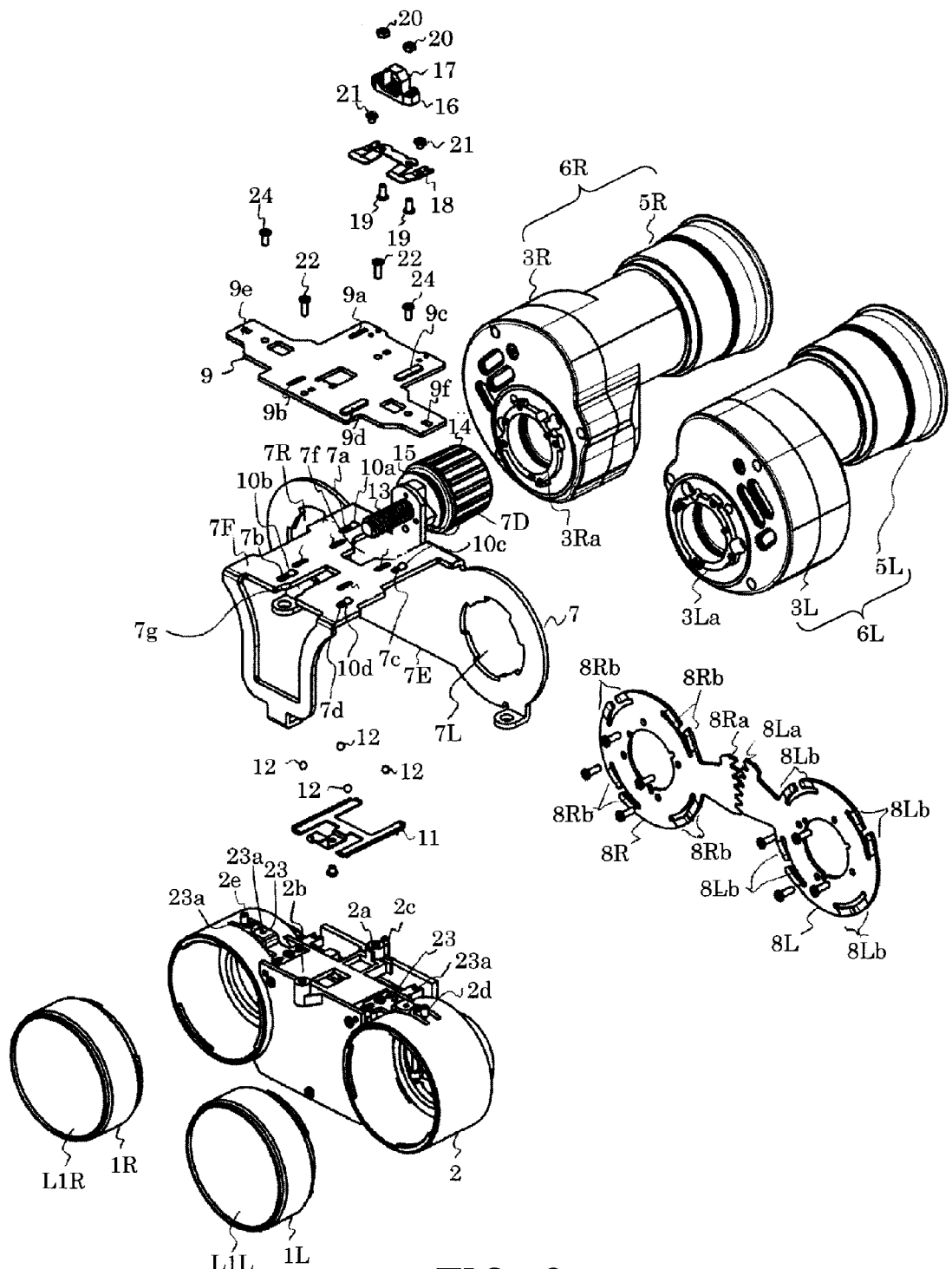
FIG. 3 is an exploded perspective view of a pair of binoculars of embodiment 1.

FIGS. 1 to 3 show configurations of a pair of binoculars as an observation apparatus that is embodiment 1 of the present invention. FIG. 1 is a cross-sectional view on a plane including left and right optical axes of the pair of binoculars. However, cross sections of left and right erecting optical systems are not shown. FIGS. 2 and 3 are a perspective view and an exploded perspective view of the pair of binoculars, respectively.

The pair of binoculars includes left and right (a pair of) observation optical systems constituted by left and right (a pair of) objective optical systems, left and right (a pair of) erecting optical systems, and left and right (a pair of) eyepiece optical systems. Reference symbols OL, OR, EL, and ER indicated in FIGS. 1 and 2 denote an optical axis of a left side objective optical system, an optical axis of a right side objective optical system, an optical axis of a left side eyepiece optical system, and an optical axis of a right side eyepiece optical system, respectively. Hereinafter, a direction in which mainly optical axes of the objective optical system and the eyepiece optical system extend is referred to as an optical axis direction, and a direction corresponding to especially a left and right direction in directions orthogonal to the optical axis is referred to as a direction orthogonal to the optical axis.

In FIGS. 1 to 3, reference numerals L1L and L1R denote objective lens units constituting parts of the left and right objective optical systems, respectively. Reference numerals L2L and L2R denote anti-vibration lens units constituting other parts of the left and right objective optical systems, respectively, and the anti-vibration lens units displace an object image that the objective optical system forms by shifting from right to left or up and down with respect to the objective optical lens units L1L and L1R.

Reference numerals L3L and L3R denote polo II type erecting prisms that are left and right erecting optical systems, respectively. Reference numeral L4L and L4R denote eyepiece lens units which constitute left and right eyepiece optical systems. Each of the polo II type erecting prisms L3L and L3R erects the object image formed as an inverted image by the left and right objective optical systems, and shifts the optical axes OL and OR to the side of the optical axes EL and ER of the left and right eyepiece optical systems, respectively. Instead of the polo II type erecting prism, a combination of a roof prism, a parallelogram prism, a mirror, and the like may be used.

Reference numerals 1L and 1R denote objective barrels which hold the lens units L1L and L1R, respectively. Reference numeral 2 denotes an anti-vibration unit including the left and right anti-vibration lens units L2L and L2R. The objective barrels 1L and 1R are positioned and fixed by a bayonet connection at left and right front end portions of the anti-vibration unit 2 to be integrated.

The optical axes of the lens units L1L and L1R correspond to optical axes of the anti-vibration lens units L2L and L2R, respectively, at a center position in a movable range from right to left or up and down of the anti-vibration lens units L2L and L2R. The left and right objective optical systems are integrally constituted by the lens units L1L and L1R and the anti-vibration lens units L2L and L2R. The lens units L1L and L1R and the anti-vibration lens units L2L and L2R correspond to left and right (a pair of) first optical elements.

Reference numerals 4L and 4R denote eyepiece barrels which hold the eyepiece lens units L4L and L4R, respectively. Reference numerals 3L and 3R denote support frames for holding the polo II type erecting optical systems L3L and L3R and the eyepiece barrels 4L and 4R, respectively. The eyepiece lens units L4L and L4R and the polo II type erecting prisms L3L and L3R correspond to left and right (a pair of) second light optical systems.

Reference numerals 5L and 5R denote eyepiece rubbers which are fixed on the eyepiece barrels 4L and 4R, respectively, and are in contact with an area around the eyes of the observer.

A male helicoid is formed at a circumference of each of the eyepiece barrels 4L and 4R, and a female helicoid is formed on an inner circumference wall of each of the support frames 3L and 3R. The eye piece lens units L4L and L4R move in an optical axis direction to be able to perform a visibility adjustment by rotating the eyepiece barrels 4L and 4R in a state where the male helicoid engages with the female helicoid. Left and right (a pair of) eyepiece units 6L and 6R are constituted by the support frames 3L and 3R, the polo II type erecting prisms L3L and L3R, the eyepiece barrels 4L and 4R, and the eyepiece lens units L4L and L4R, respectively.

Reference numeral 7 denotes a base member (second member) which rotatably supports the eyepiece units 6L and 6R around the optical axes OL and OR of the left and right objective optical systems, respectively. The base member 7 is a fixed member that is a base of a focus mechanism for focusing in accordance with a distance (hereinafter, referred to as an observation distance) up to an object to be observed by moving the left and right objective optical systems described later in the optical axis direction.

Opening portions 7L and 7R are formed on an eyepiece unit fixing portion 7E which is perpendicular to the optical axes OL and OR of the left and right objective optical systems in the base member 7, and cylinder portions 3La and 3Ra formed in the support frames 3L and 3R are fitted into the opening portions 7L and 7R, respectively.

Reference numerals 8L and 8R are rotation plates which rotate the left and right eyepiece units 6L and 6R around the optical axes OL and OR of the left and right objective optical systems, respectively. Gear portions 8La and 8Ra are formed on the rotation plates 8L and 8R, respectively. These gear portions 8La and 8Ra engage with each other, and in conjunction with the rotation of one of the rotation plates, the other rotation plate rotates in a reverse direction. Furthermore, a plurality of arm portions 8Lb and 8Rb which generate biasing forces in the optical axis direction are formed on the rotation plates 8L and 8R, respectively.

The support frames 3L and 3R and the rotation plates 8L and 8R are fixed with screws, respectively, clamping the eyepiece unit fixing portion 7E of the base member 7. Thus, the eyepiece units 6L and 6R are connected so as to be rotatable around the optical axes OL and OR of the left and right objective optical systems in conjunction with each other with respect to the base member 7, respectively.

Because the optical axes EL and ER of the left and right eyepiece optical systems are shifted from the optical axes OL and OR of the left and right objective optical systems, respectively, the width between the optical axes EL and ER of the left and right of eyepiece optical systems is changed by rotating the left and right eyepiece units 6L and 6R around the optical axes OL and OR of the left and right objective optical systems. Thus, an interpupillary distance between left and right of an observer can be conformed to a distance between the optical axes EL and ER of the left and right eyepiece optical systems, i.e. an interpupillary adjustment can be performed.

The eyepiece units 6L and 6R adjust positions of the polo II type erecting prisms L3L and L3R so that object images observed through the left and right eyepiece lens units L4L and L4R are not displaced at the time of interpupillary adjustment, respectively. In this position adjustment, rotation axes of the eyepiece units 6L and 6R are conformed to the optical axes of the eyepiece lens units L4L and L4R, respectively.

Hereinafter, a focus mechanism will be described. Reference numeral 7F denotes a base plate portion which extends in parallel to the optical axes OL and OR of the left and right objective optical systems in the base member 7.

Reference numeral 9 denotes a focus support plate (first member) on which the left and right objective optical systems are fixed, and is disposed at the upper side of the base plate portion 7F to be movable with respect to the base plate portion 7F in the optical axis direction. Reference numerals 10a and 10b denote first balls, and reference numeral 10c denotes a second ball. Reference numeral 10d denotes a fourth ball. These balls 10a to 10d have the same diameter as one another, and for example, a rigid sphere for ball bearing is used for the balls.

Reference numerals 7a and 7b denote guide groove portions which are formed at positions away from each other in the optical axis direction in the base plate portion 7F so as to extend in the optical axis direction and hold the balls 10a and 10b so as to be able to perform a rolling motion in the optical direction, respectively. Reference numerals 7c and 7d denote holding groove portions which are formed at positions away from the guide groove portions 7a and 7b in the base plate portion 7F in a direction orthogonal to the optical axis and away from each other in the optical axis direction so as to extend in the optical axis direction and hold the balls 10c and 10d so as to be able to perform a rolling motion in the optical axis direction, respectively.

Reference numerals 9a and 9b denote guide groove portions which are formed at positions away from each other in the optical axis direction in the focus support plate 9 so as to extend in the optical axis direction and hold the balls 10a and 10b so as to be able to perform a rolling motion in the optical axis direction, respectively. Reference numerals 9c and 9d denote holding groove portions which are formed at positions away from the guide groove portions 9a and 9b in the focus support plate 9 in a direction orthogonal to the optical axis and away from each other in the optical axis direction so as to extend in the optical axis direction and hold the balls 10c and 10d so as to be able to perform a rolling motion in the optical axis direction, respectively.

The guide groove portions 7a and 7b and the guide groove portions 9a and 9b are formed on one of the base plate portion 7F and the focus support plate 9 so as to face each other, respectively, and the guide groove portions 7a and 9a and the guide groove portions 7b and 9b constitute two guide portions distant from each other in the optical axis direction.

The holding groove portions 7c and 7d and the holding groove portions 9c and 9d are also formed on one of the base plate portion 7F and the focus support plate 9 so as to face each other, respectively. The holding groove portions 7c and 9c and the holding groove portions 7d and 9d constitute two ball holding portions distant from the two guide portions described above in the direction orthogonal to the optical axis (and distant from each other in the optical axis direction).

In accordance with a movement of the focus support plate 9 with respect to the base plate portion 7F in the optical axis direction, in each guide portion and ball holding portion, each ball performs a rolling motion in the optical axis direction. Thus, a load (frictional force) generated when the focus support plate 9 moves with respect to the base plate portion 7F in the optical axis direction can be reduced. The shapes or the actions of the guide portion and the ball holding portion will be described later.

Reference numeral 11 denotes a plate spring as an elastic member, and is disposed at a side opposite to the focus support plate 9 (at a lower side) with respect to the base plate portion 7F. The plate spring is formed like an H-shape where the optical axis direction is a longitudinal direction, and is connected to the focus support plate 9 with a screw at an area of a front side of the center (an object side). Reference numeral 12 denotes four balls, and the four balls 12 are disposed at four areas distant from one another in the optical axis direction and the direction orthogonal to the optical axis in the base plate portion 7F, between the holding groove portion 7e formed so as to extend in the optical axis direction and two portions extending in the optical axis direction in the plate spring 11.

A biasing force generated by elastic deformation of the plate spring 11 is transferred to the focus support plate 9 via the screw. Thus, the focus support plate 9, at the guide groove portions 9a and 9b and the holding groove portions 9c and 9d described above, presses the balls 10a to 10d to the guide groove portions 7a and 7b and the holding groove portions 7c and 7d of the base plate portion 7F. In other words, the plate spring 11 generates a biasing force for clamping the balls 10a to 10d between the focus support plate 9 and the base plate portion 7F.

The ball 12 performs a rolling motion between the plate spring 11 and the holding groove portion 7e in the optical axis direction, in accordance with the movement of the plate spring 11 in the optical axis direction. Thus, a load (frictional force) generated when the plate spring 11 moves integrally with the focus support plate 9 with respect to the base plate portion 7F in the optical axis direction can be reduced. A biasing device is constituted by the plate spring 11 and the four balls 12. End portions of the plate spring 11 in the optical axis direction and in the direction orthogonal to the optical axis are folded toward a side of the base plate portion 7F (an upper side), and thus, the four balls 12 are held between the plate spring 11 and the holding groove portion 7e.

In the present embodiment, the four balls 12 are disposed between the plate spring 11 and the base plate portion 7F, but the plate spring 11 may be directly in contact with the base plate portion 7F without using any balls. In this case, although the plate spring 11 slides on the base plate portion 7F, the increase of the load can be suppressed by designing the shape of the plate spring 11 so as to reduce the sliding friction.

Figure 4:
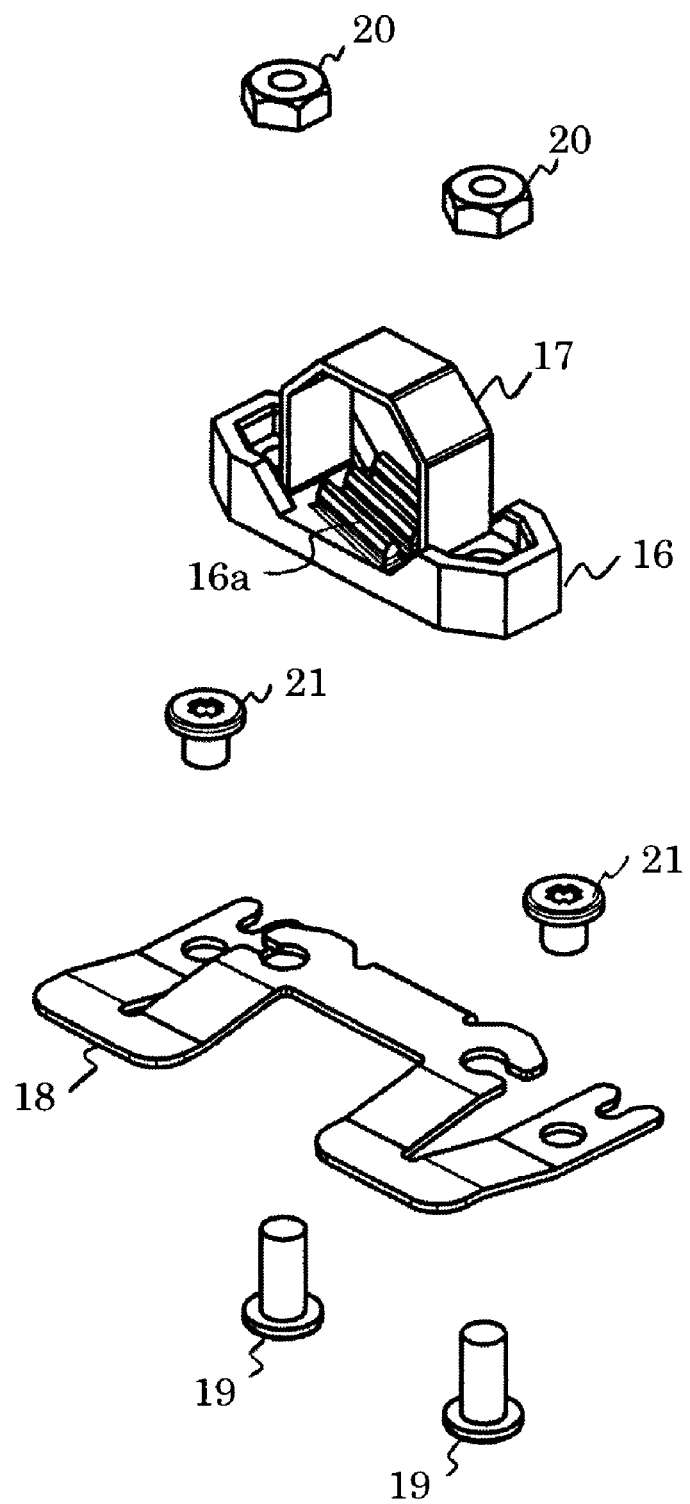
FIG. 4 is an exploded perspective view of a drive mechanism in embodiment 1.
Figure 5:
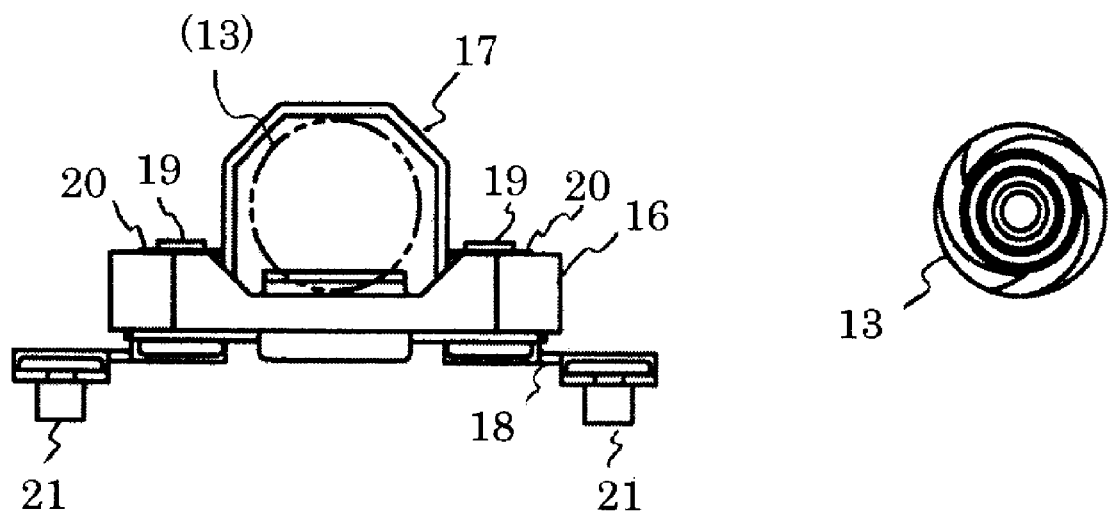
FIG. 5 is a back view of a drive mechanism in embodiment 1.
Figure 19:
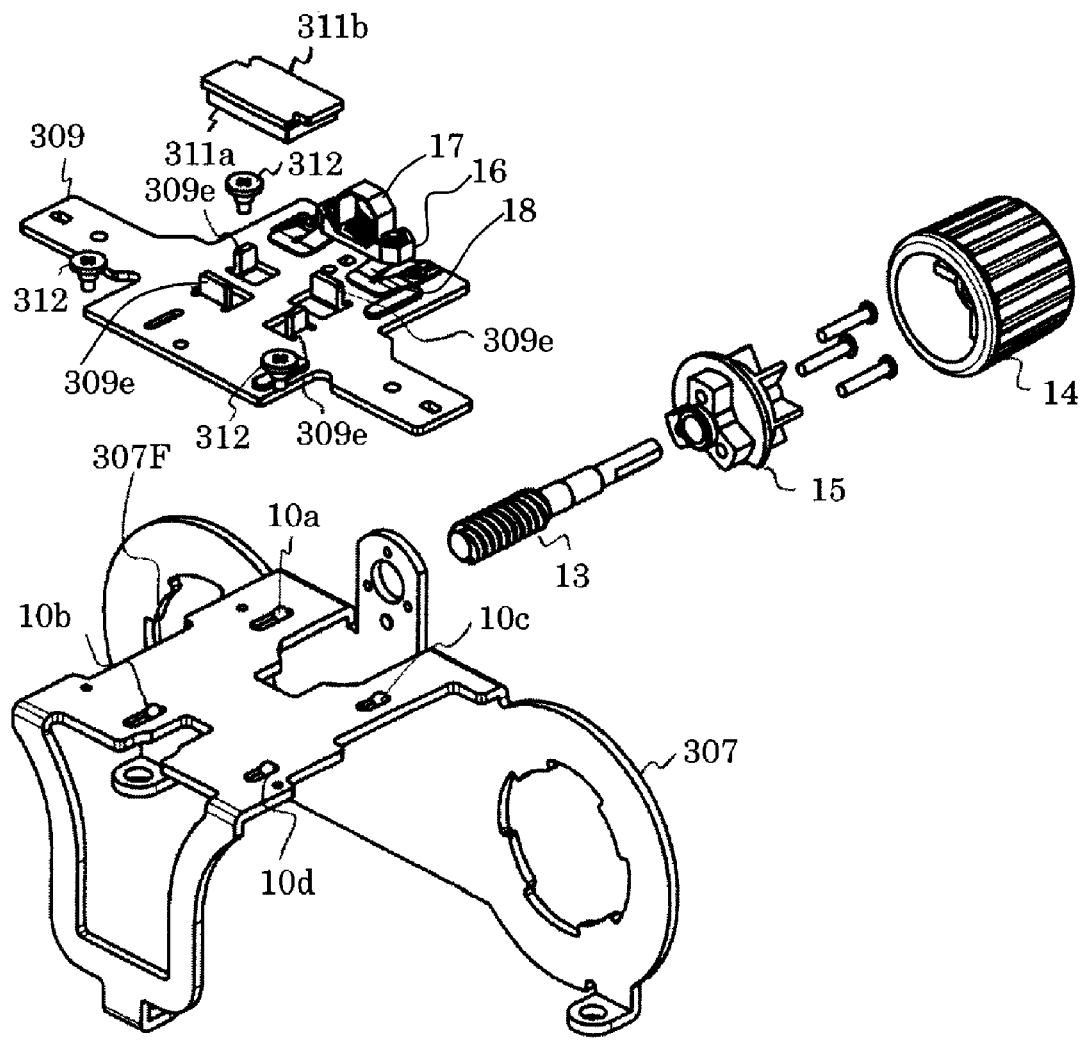
FIG. 19 is an exploded perspective view of a focus mechanism in embodiment 4.

As shown also in FIGS. 4 and 5, reference numeral 13 denotes a feed screw as an input member rotatable at a fixed position, and reference numeral 14 denotes an operational dial which is connected to a rear end of the feed screw 13 and rotates integrally with the feed screw 13. Reference numeral 15 denotes a ball bearing which supports the operational dial 14 so as to be rotatable at a fixed position, and is fixed with a screw on an extension portion 7D extending upward from the eyepiece unit fixing portion 7E. A drive member is constituted by the feed screw 13 and the operational dial 14. FIG. 19 shows an exploded view of the feed screw 13, the operational dial 14, and the ball bearing 15 although it will be used for embodiment 4 described later.

Reference numeral 16 denotes a rack where a rack gear 16a engaging with the feed screw 13 is formed. Reference numeral 17 denotes a screw holder, and is a member for holding the engagement between the feed screw 13 and the rack gear 16a. A driven member is constituted by the rack 16 and the screw holder 17.

Reference numeral 18 denotes a rack biasing spring as a connection member. The rack biasing spring 18 is formed like the following shape. In other words, it has elasticity in an upward and downward direction so as to generate an appropriate elastic force (biasing force) in the upward and downward direction including an upward direction (engagement direction) in which the rack gear 16a engages with the feed screw 13. Further, it has rigidity in the optical axis direction that is an axis direction of the feed screw 13 higher than that in the engagement direction (or the upward and downward direction).

The rack 16 and the screw holder 17 are attached on an upper end surface of the rack biasing spring 18 by using a screw 19 and a nut 20. A drive mechanism as a drive unit is constituted by the rack biasing spring 18, the rack 16, the screw holder 17, the feed screw 13, and the operational dial 14. The rack biasing spring 18 is connected to an upper surface of the focus support plate 9 by using a screw 21.

In the drive mechanism constituted as described above, the rack gear 16a is tilted in a lead direction of the feed screw 13, and as shown in FIG. 5, it engages with a lower end portion of the feed screw 13 by being biased in an upward direction caused by an elastic force in the upward direction generated by elastic deformation of the rack biasing spring 18 in a downward direction.

When the operational dial 14 is rotationally operated so that the feed screw 13 rotates (operates), the rack 16, the rack biasing spring 18, and the focus support plate 9 move in the optical axis direction, by a driving force in the optical axis direction generated by an engagement action between the feed screw 13 and the rack gear 16a.

The anti-vibration unit 2 is provided with boss portions 2a and 2b fixed on the focus support plate 9 with screws, a positioning pin 2c which determines a position in a left and right direction, and positioning pins 2d and 2e which determine positions in the optical axis direction. The boss portions 2a and 2b and the positioning portion 2c pass through opening portions 7f and 7g formed at the base plate portion 7F of the base member 7 to be fixed on the focus support plate 9 with two screws 22. The positioning pins 2d and 2e are inserted into long groove portions 9f and 9e formed in the focus support plate 9 so as to extend in a direction orthogonal to the optical axis, respectively. Thus, the left and right objective optical systems are integrally fixed on the focus support plate 9.

Therefore, a focusing operation for an object can be performed in accordance with the observation distance by moving the focus support plate 9 in the optical axis direction using the drive mechanism described above.

When the screw holder 17 is placed at a position slightly higher than that of an upper end portion of the feed screw 13, the release of the engagement between the feed screw 13 and the rack gear 16a is prevented.

The position displacement of the feed screw 13 in a left and right direction is absorbed by permitting the displacement of the position engaging with the rack gear 16a. The position displacement of the feed screw 13 in an upward and downward direction is absorbed by elastic deformation of the rack biasing spring 18 in the upward and downward direction.

Therefore, even if the relative position accuracy between the feed screw 13 and the rack 16 is not high, the increase of the frictional force generated by the slide between the feed screw 13 and the rack gear 16a can be prevented.

Figure 6:
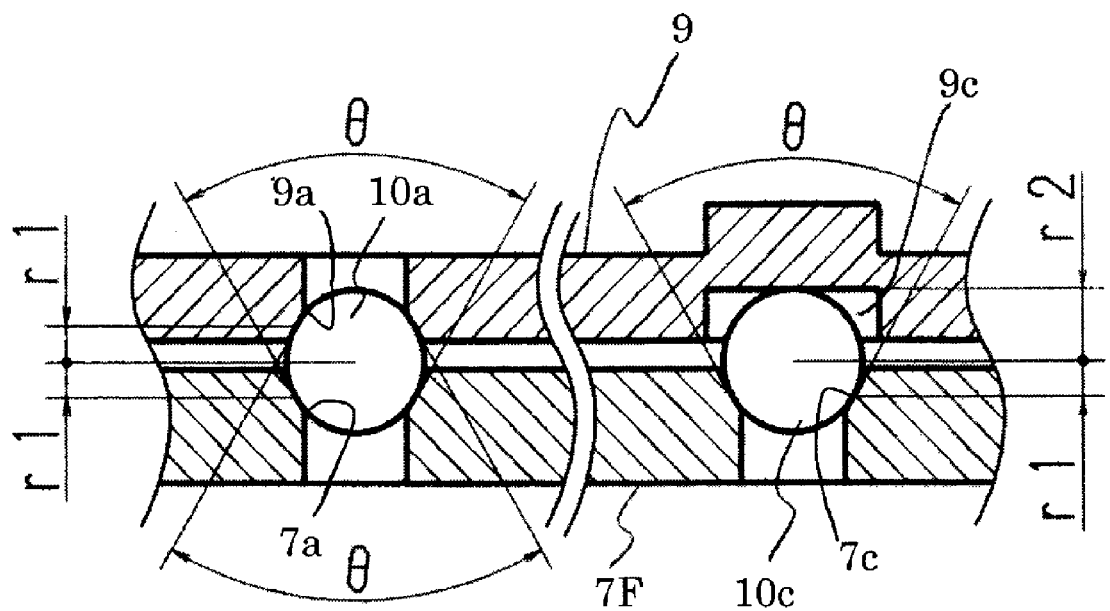
FIG. 6 is a cross-sectional view of a guide portion and a ball holding portion in embodiment 1.

Next, referring to FIGS. 6 to 8, the shapes and the actions of the guide portion and the ball holding portion formed in each of the focus support plate 9 and the base plate portion 7F (the base member 7) will be described in detail. FIG. 6 is a cross-sectional view showing a shape of the guide portion and the ball holding portion which clamp each of the balls 10a and 10c when viewed from the optical axis direction, and the shape shown in the cross-sectional view continues up to both ends of the guide portion and the ball holding portion in the optical axis direction. A guide portion and a ball holding portion which clamp each of the balls 10b and 10d also have similar shapes.

In FIG. 6, left and right inclined planes of the guide groove portion 9a formed in the focus support plate 9 are in contact with left and right portions which are positioned upward at a distance r1 from a center of the ball 10a. Further, left and right inclined planes of the guide groove portion 7a formed in the base plate portion 7F are in contact with left and right portions which are positioned downward at a distance r1 from a center of the ball 10a. An angle (open angle) between the left and right inclined planes in each guide groove portion is θ. When the angle θ is 60 degrees, the distance r1 is equal to half of the radius of each ball.

The guide portion (guide groove portions 7a and 9a) having such a shape engages with the ball 10a in a left and right direction so as to permit a rolling motion of the ball 10a in the optical axis direction and prevent the displacement of the focus support plate 9 with respect to the base plate portion 7F in the left and right direction (the direction orthogonal to the optical axis).

Further, left and right inclined planes of the holding groove portion 7c formed in the base plate portion 7F are in contact with left and right portions which are positioned downward at a distance r1 from a center of the ball 10c. In other words, the holding groove portion 7c engages with the ball 10c in the left and right direction. An angle between the left and right inclined planes of the holding groove portion 7c is θ which is the same angle as that of the guide groove portion 7a. However, a plane portion corresponding to a lower surface of the holding groove portion 7c with a concave cross-sectional shape which has a width greater than a diameter of the ball 10c is in contact with an upper end of the ball 10c. A distance r2 between the plane portion and the center of the ball 10c is equal to the radius of the ball 10c.

The ball holding portion (holding groove portions 7c and 9c) having such a shape holds the ball 10c so as to permit a rolling motion of the ball 10c in the optical axis direction.

The focus support plate 9 and the base plate portion 7F are maintained in parallel with a predetermined gap between each other in a state where each guide portion and each ball holding portion clamp the ball by the biasing force of the plate spring 11.

Figure 7:
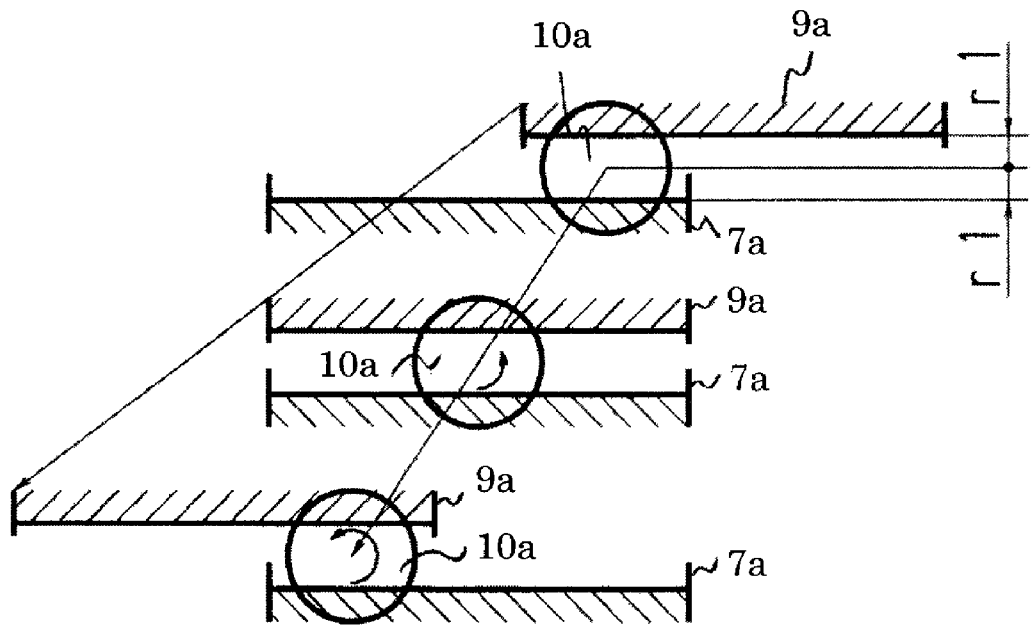
FIG. 7 is a view describing a motion of a guide portion in embodiment 1.

FIG. 7 shows a change of the relative position between the guide groove portions 7a and 9a clamping the ball 10a when the focus support plate 9 moves with respect to the base plate portion 7F in the optical axis direction (from the right side to the left side of FIG. 7). The change of the relative position of the guide groove portions 7b and 9b clamping the ball 10b is also similar. A long horizontal line in FIG. 7 indicates a contact line between the inclined planes of the guide groove portions 7a and 9a and the ball 10a, and a short vertical line provided at both ends of the long horizontal line indicates both ends (stoppers) of the guide groove portions 7a and 9a.

In accordance with the movement of the focus support plate 9 to the left side of FIG. 7, the ball 10a contacting the guide groove portions 7a and 9a, as indicated by an arrow, moves to the left side while performing a counterclockwise rolling motion. In this case, the ball 10a performs a rolling motion while contacting the guide groove portions 7a and 9a at the same distance r1. Therefore, a moving amount of the ball 10a with respect to the guide groove portion 7a that is at a fixed side in the optical axis direction is the same as that of the guide groove portion 9a with respect to the ball 10a in the optical axis direction. In other words, a ratio of a moving amount of the ball 10a with respect to the base plate portion 7F in the optical axis direction and a moving amount of the focus support plate 9 in the optical axis direction is 1:2.

In other words, the lengths of the guide groove portions 7a and 9a in the optical axis direction which clamp the ball 10a so as to perform a rolling motion has only to be half of a movable amount of the focus support plate 9 in the optical axis direction. Therefore, even if the movable amount of the focus support plate 9 in the optical axis direction is large, the lengths of the guide groove portions 7a and 9a formed in the base plate portion 7F and the focus support plate 9, respectively, can be shortened.

Figure 8:
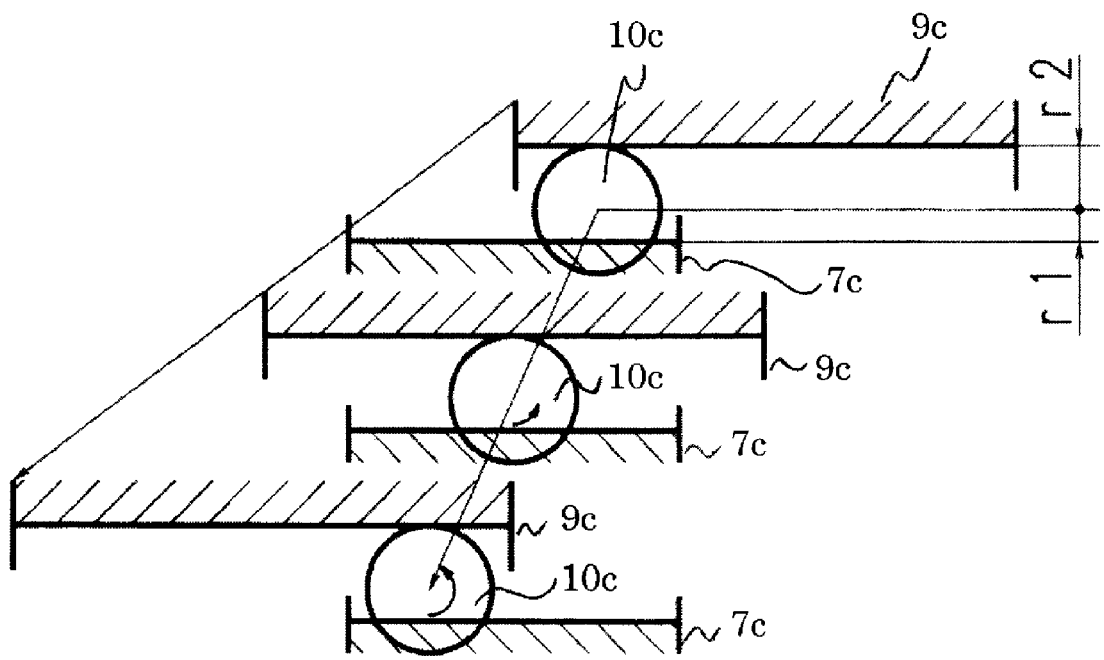
FIG. 8 is a view describing a motion of a ball holding portion in embodiment 1.

FIG. 8 shows a change of a relative position of the holding groove portions 7c and 9c clamping the ball 10c when the focus support plate 9 moves with respect to the base plate portion 7F in the optical axis direction (from the right side to the left side of FIG. 8). The change of a relative position of the holding groove portions 7d and 9d clamping the ball 10d is also similar. A long horizontal line in FIG. 8 indicates a contact line between the inclined planes of the holding groove portions 7c and 9c and the ball 10c, and a short vertical line at both ends of the long horizontal line indicates both ends (stoppers) of the holding groove portions 7c and 9c.

In accordance with the movement of the focus support plate 9 to the left side in FIG. 8, the ball 10c which is in contact with the holding groove portions 7c and 9c, as indicated by an arrow, moves to the left side while performing a counterclockwise rolling motion. In this case, while the ball 10c performs a rolling motion in contact with the holding groove portion 7c at a distance r1, it performs a rolling motion in contact with the holding groove portion 9c at a distance r2. When the angle θ between both inclined planes of the holding groove portion 7c is 60 degrees, the distance r1 is equal to half of the radius of the ball 10c and the distance r2 is equal to the radius of the ball 10c, and the ratio of r1 and r2 is 1:2. Therefore, a ratio of a moving amount of the ball 10c with respect to the holding groove portion 7c that is a fixed side in the optical axis direction and a moving amount of the guide groove portion 9c with respect to the ball 10c in the optical axis direction is also 1:2. Thus, a ratio of a moving amount of the ball 10c with respect to the base plate portion 7F in the optical axis direction and a moving amount of the focus support plate 9 in the optical axis direction is 1:3.

In other words, the length of the holding groove portion 7c in the optical axis direction in the holding groove portions 7c and 9c which clamp the ball 10c so as to perform a rolling motion has only to be one third of the movable amount of the focus support plate 9 in the optical axis direction. Therefore, even if the movable amount of the focus support plate 9 in the optical axis direction is large, the length of the holding groove portion 7c formed in the base plate portion 7F can be shortened.

As described above, when the four balls are configured to be able to be clamped by the guide portions and the ball holding portions, due to a dimension error, the condition in which all of the four balls are clamped at the same time does not practically happen, and commonly, only three balls are clamped. However, since the balls 10a and 10b have a role that guides the focus support plate 9 in the optical axis direction, they need to be always in a clamp state. Therefore, in the present embodiment, a dimension setting is performed so that a slight gap is formed between the ball 10d and the holding groove portion 7d or 9d and that the balls 10a and 10b and the ball 10c are surely in a clamp state. The ball 10d has a role of preventing excess deformation of the plate spring 11 caused by an external force applied to the focus support plate 9, or the like.

Figure 9:
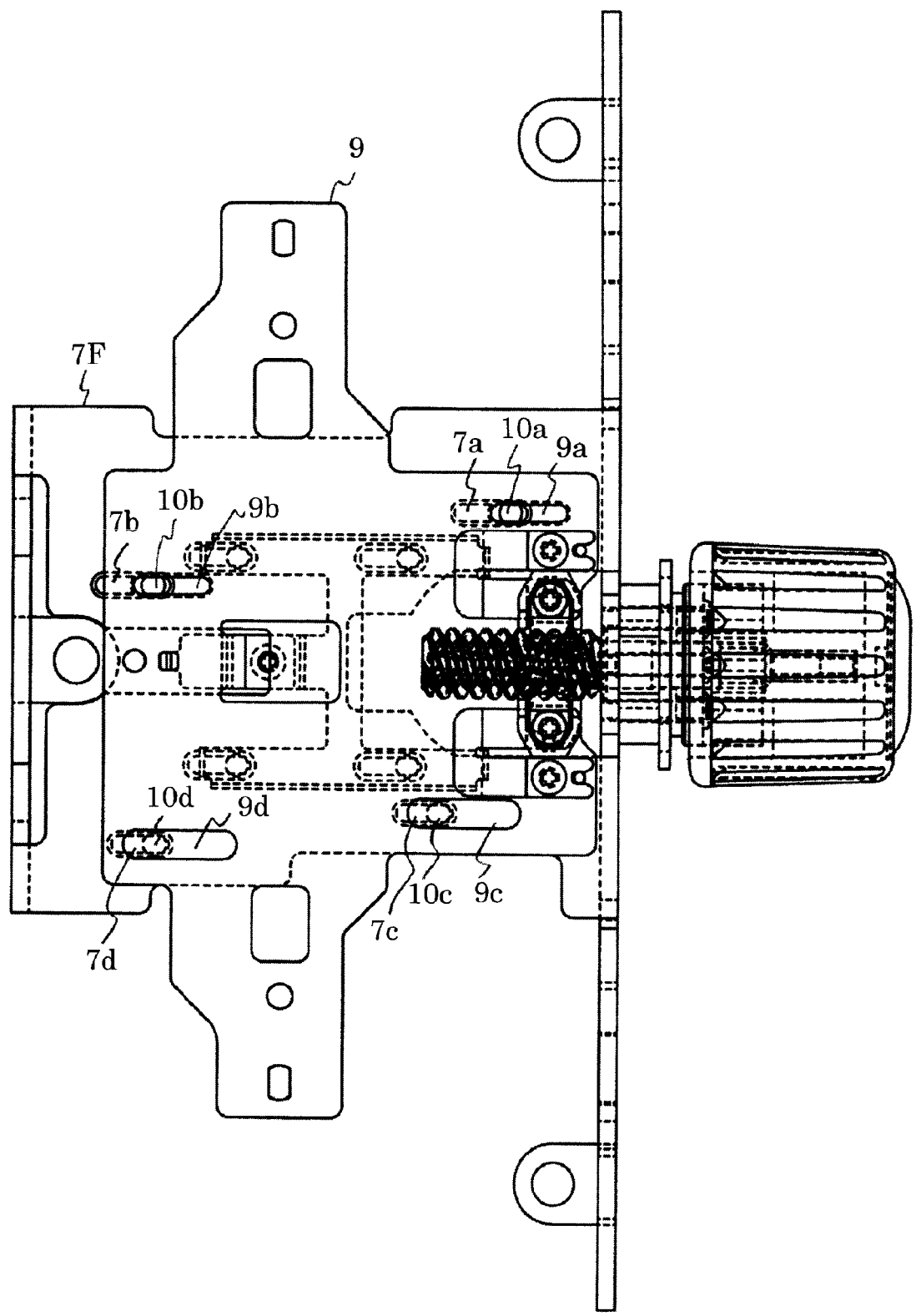
FIG. 9 is a plan view showing an appearance of a guide portion and a ball holding portion when a focus support plate is positioned at a side closest to an eyepiece unit in embodiment 1.
Figure 10:
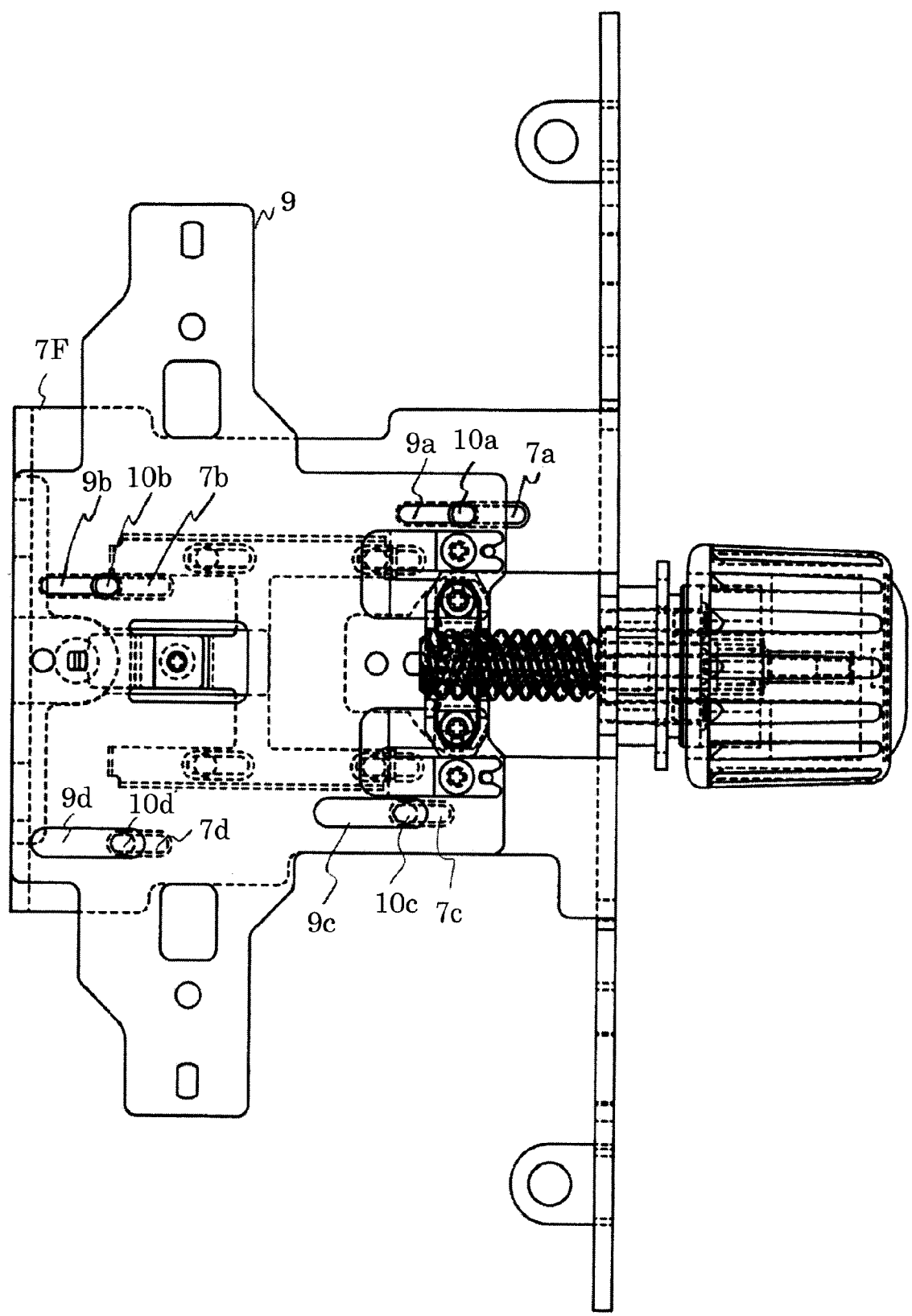
FIG. 10 is a plan view showing an appearance of a guide portion and a ball holding portion when a focus support plate is positioned at a side closest to an object in embodiment 1.

FIGS. 9 and 10 show appearances of the guide portion and the ball holding portion in the cases where the focus support plate 9 is positioned at a side closest to the eyepiece unit and at a side closest to the object, respectively, when viewed from above (from a side of the focus support plate 9). In these drawings, members which do not relate to the descriptions are omitted.

The balls 10a and 10b move (perform rolling motions) in the optical axis direction between the cases where the focus support plate 9 is positioned at the side closest to the eyepiece unit and at the side closest to the object, and each of the position relation of the guide groove portions 7a and 9a in the optical axis direction and the position relation of the guide groove portions 7b and 9b in the optical axis direction is reversed. Because the balls 10a and 10b perform rolling motions in accordance with the movement of the focus support plate 9, the lengths of the guide groove portions 7a, 9a, 7b, and 9b can be shortened compared with the moving amount of the focus support plate 9.

As is clear from the above description, the configuration of guiding the focus support plate 9 via the balls 10a to 10d in the optical axis direction in the present embodiment, compared with a conventional configuration, a larger amount of the movement of the focus support plate 9 with a small space can be realized. Further, the balls 10a and 10b are in contact with (engage with) the guide portion at the eyepiece unit side (guide groove portions 7a and 9a) and the guide portion at the object side (guide groove portions 7b and 9b) clamping these balls without backlash, respectively. Therefore, even if the gaps of these two guide portions in the optical axis direction are shortened, a good positioning accuracy of the focus support plate 9 with respect to the base member 7 can be ensured, and the focus support plate 9 can be moved with a small load in the optical axis direction.

Lubricant that has an appropriate viscosity is preferably applied between the guide portion and the boll holding portion. This is because the lubricant that has an appropriate viscosity can prevent, to some extent, the displacement of the position relation between the guide portion and the ball holding portion and the ball from a predetermined relation shown in FIGS. 7 to 10, which is caused by an external force (shock) applied to the pair of binoculars. Further, even if the position relation is displaced, a slide frictional force generated when the ball slides on the guide portion and the ball holding portion can be reduced to easily return these balls to the predetermined position relation. The configuration of the focus mechanism is as described above.

Figure 11:
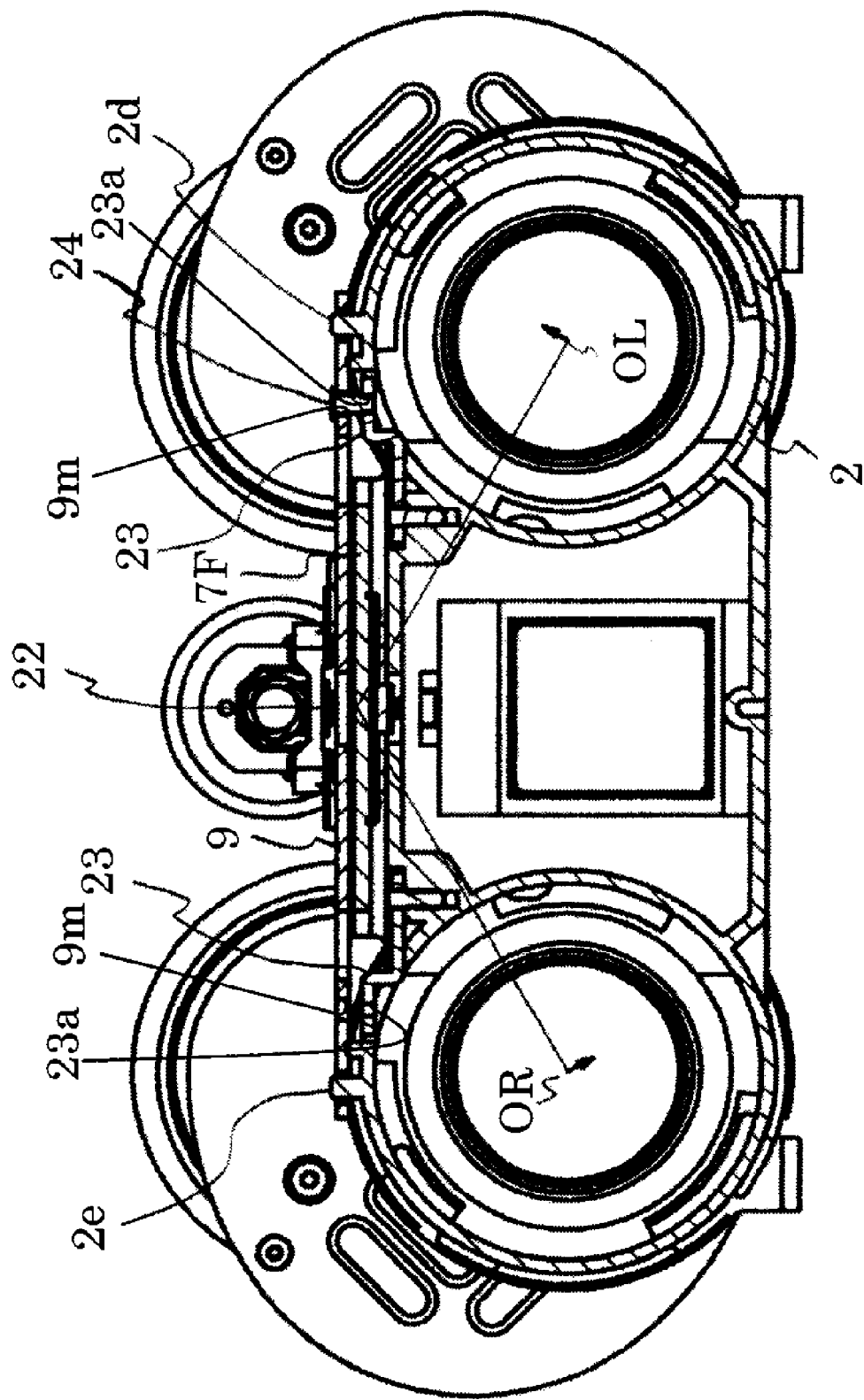
FIG. 11 is a view describing an optical axis adjusting mechanism in embodiment 1.

Next, an optical axis adjusting mechanism will be described. FIG. 11 shows a cross section of a plane A shown in FIG. 2. The plane A is orthogonal to the optical axes OL and OR of the left and right objective optical systems, and is a plane penetrating the positioning pins 2d and 2e of the anti-vibration unit 2. FIG. 11 shows a state where the optical axis OL of the left objective optical system (shown at the right side of FIG. 11) is positioned below with respect to the optical axis OR of the right objective optical system (shown at the left side of FIG. 11).

Reference numeral 23 denotes two optical axis adjusting members which are fixed on the anti-vibration unit 2 with screws, and they are arranged at the left and right side, respectively. As shown also in FIG. 3, a female screw portion 23a is formed in each of the optical axis adjusting members 23. Reference numeral 24 denotes optical axis adjusting screws, and they pass through holes 24a formed in the focus support plate 9 to be screwed into the left and right female screw portions 23a. However, In FIG. 11, the optical axis adjusting screw 24 which is screwed into the female screw portion 23a at the left objective optical system side is only shown.

In a state of FIG. 11, when the optical axis adjusting screw 24 at the left objective optical system side is screwed, a section of the left objective optical system side in the optical axis adjusting members 23 gets close to the focus support plate 9 (displaced upward). Thus, the anti-vibration unit 2 is displaced so that the optical axes OL and OR move in an upper right direction and a lower right direction, respectively, when a section fixed on the focus support plate 9 with a screw 22 is regarded as a center. Thus, the optical axes OL and OR are adjusted so that positions of the object images in an upward and downward direction, each of which is observed by one of the left and right eyepiece units 6L and 6R, corresponds to each other. The positions of the object images in the upward and downward direction, each of which is observed by one of the left and right eyepiece units 6L and 6R, move by the same amount.

When performing an optical axis adjustment in a state where the optical axis OL of the left objective optical system is positioned on an upper side with respect to the optical axis OR of the right objective optical system, the optical axis adjusting screw 24 at the right objective optical system side has only to be screwed. After the optical axis adjustment, in order to prevent the optical axis adjusting screw 24 from loosing by vibration or shock, it is preferably fixed with respect to the focus support plate 9 or the optical axis adjusting member 23 using an adhesive.

Reference numeral 25 shown in FIG. 1 is an objective side exterior member which houses the left and right objective optical systems, the optical axis adjusting mechanism, the focus mechanism, and the like. The objective side exterior member 25 is omitted in FIGS. 2, 3, and 11.

Figure 12:
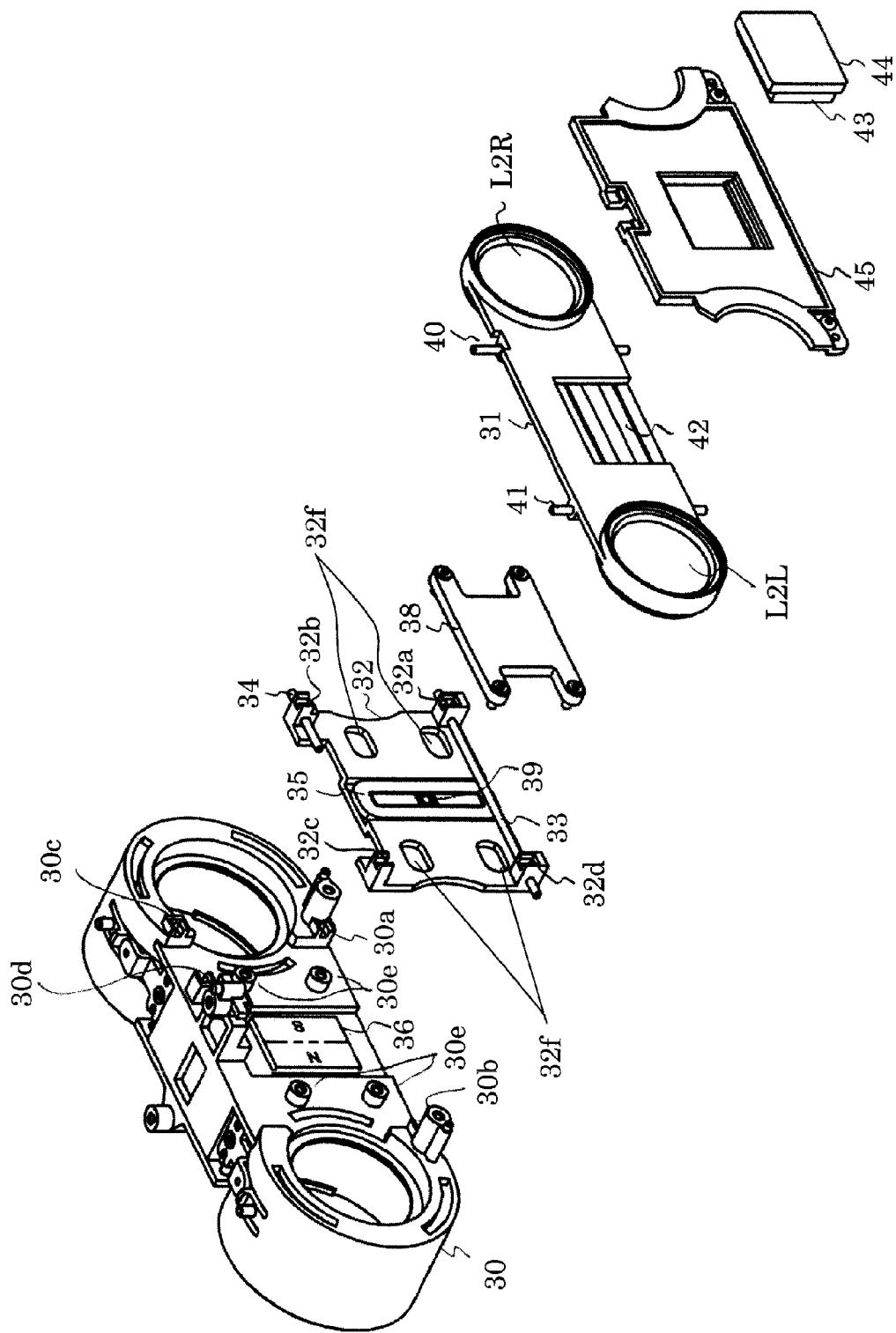
FIG. 12 is an exploded perspective view of an anti-vibration unit in embodiment 1.

FIGS. 1 and 12 show configurations of the anti-vibration unit 2. Reference numeral 30 shown in FIG. 12 denotes a base member of the anti-vibration unit 2. Reference numeral 31 shown in FIGS. 1 and 12 denotes a movable member which holds the anti-vibration lens units L2L and L2R. When the movable member 31 shifts without rotating with respect to the base member 30 in an upward and downward direction and in left and right direction, the object images that the left and right objective optical systems form also shift in the upward and downward direction and in the left and right direction.

Reference numeral 32 denotes a guide member which is supported so as to be movable only in the left and right direction with respect to the base member 30. Reference numerals 33 and 34 denote guide bars which guide a motion of the guide member 32 in the left and light direction. Both end portions of the guide bar 33 are pressed or adhesively fixed on groove portions 30a and 30b of the base member 30. Both end portions of the guide bar 34 are pressed or adhesively fixed on groove portions 30c and 30d of the base member 30.

Reference numeral 35 denotes a drive coil, and is adhesively fixed on a center part of a left and right direction of the guide member 32. Reference mineral 36 denotes a drive magnet, and is magnetized so that the north pole and the south pole are arranged in a left and right direction as shown in the drawings. A yoke 37 is absorbed, as shown in FIG. 1, on a back surface of the drive magnet 36. The yoke 37 closes a magnetic circuit at the back surface side of the drive magnet 36.

The base member 30 is provided with four boss portions 30e, and the four boss portions 30e penetrate pass through four long holes 32f, extending in the left and right direction, formed in the guide member 32. Reference numeral 38 denotes a yoke, and is fixed with a screw at an end of the boss portion 30e passing through the four long holes 32f. The yoke 38 closes the magnetic circuit at the eyepiece unit side with reference to the drive magnet 36. A slight gap is formed between the yoke 38 and the drive magnet 36. Thus, the drive coil 35 is disposed between the drive magnet 36 and the yoke 38.

When electric current is applied to the drive coil 35, Lorentz force is generated to shift the guide member 32 in the left and right direction. A hall element 39 that is a magnetic sensor is attached at a position corresponding to a center of the drive coil 35 in the guide member 32. The hall element 39 outputs an electric signal in accordance with a magnetic flux density. The magnetic flux density detected by the hall element 39 is changed and the electric signal outputted from the hall element 39 is also changed by the guide member 32 shifting in the left and right direction and by the hall element 39 moving with respect to the drive magnet 36 in the left and right direction. The position of the guide member 32 in the left and right direction can be detected by using the electric signal.

Reference numerals 40 and 41 denote guide bar, and support the movable member 31 so as to be movable with respect to the guide member 32 only in the upward and downward direction. Both end portions of the guide bar 40 are pressed or adhesively fixed in the groove portions 32a and 32b formed in the guide member 32. Both end portions of the guide bar 41 are pressed or adhesively fixed in the groove portions 32c and 32d formed in the guide member 32.

Reference numeral 42 denotes a drive coil, and is adhesively fixed on the movable member 31. Reference numeral 43 denotes a drive magnet, and is held by a support member 45 so that a direction of the drive magnet 43 is different by 90 degrees from that of the drive magnet 36, i.e. the north pole and the south pole are arranged in the upward and downward direction.

Reference numeral 44 denotes a yoke which is absorbed at a back side of the drive magnet 43. The magnetic circuit of the drive magnet 43 can be closed by sharing the yoke 38 as a yoke at a side of the drive coil 42 of the drive magnet 43.

The support member 45 is fixed with a screw after positioning with respect to the base member 30.

When electric current is applied to the drive coil 42, Lorentz force is generated to be able to shift the movable member 31 in the upward and downward direction. A hall element 46 that is a magnetic sensor is attached at a position corresponding to a center of the drive coil 42 in the movable member 31 (not shown). The magnetic flux density detected by the hall element 46 is changed and the electric signal outputted from the hall element 46 is also changed by the movable member 31 shifting in the upward and downward direction and by the hall element 46 moving with respect to the drive magnet 43 in the upward and downward direction. The position of the movable member 31 in the upward and downward direction can be detected by using the electric signal.

An electric circuit board is integrally fixed on the anti-vibration unit 2 (not shown). An angular velocity sensor (a deflection sensor) which detects an angular velocity in a pitch direction (upward and downward direction) and a yaw direction (left and right direction) of the pair of binoculars is attached on the board. A vibration gyro is used as an angular velocity sensor, for example.

An electric component such as a micro computer which processes an output from the hall elements 39 and 46 or controls to apply electric current to the drive coils 35 and 42 is also mounted on the electric circuit board. Furthermore, a power unit that is a power supply source of the anti-vibration unit 2, an operating switch that a user uses for switching ON/OFF of the anti-vibration function, or a display element such as an LED indicating an operating state of the anti-vibration unit 2 is also mounted on the board.

Embodiment 2

Figure 13:
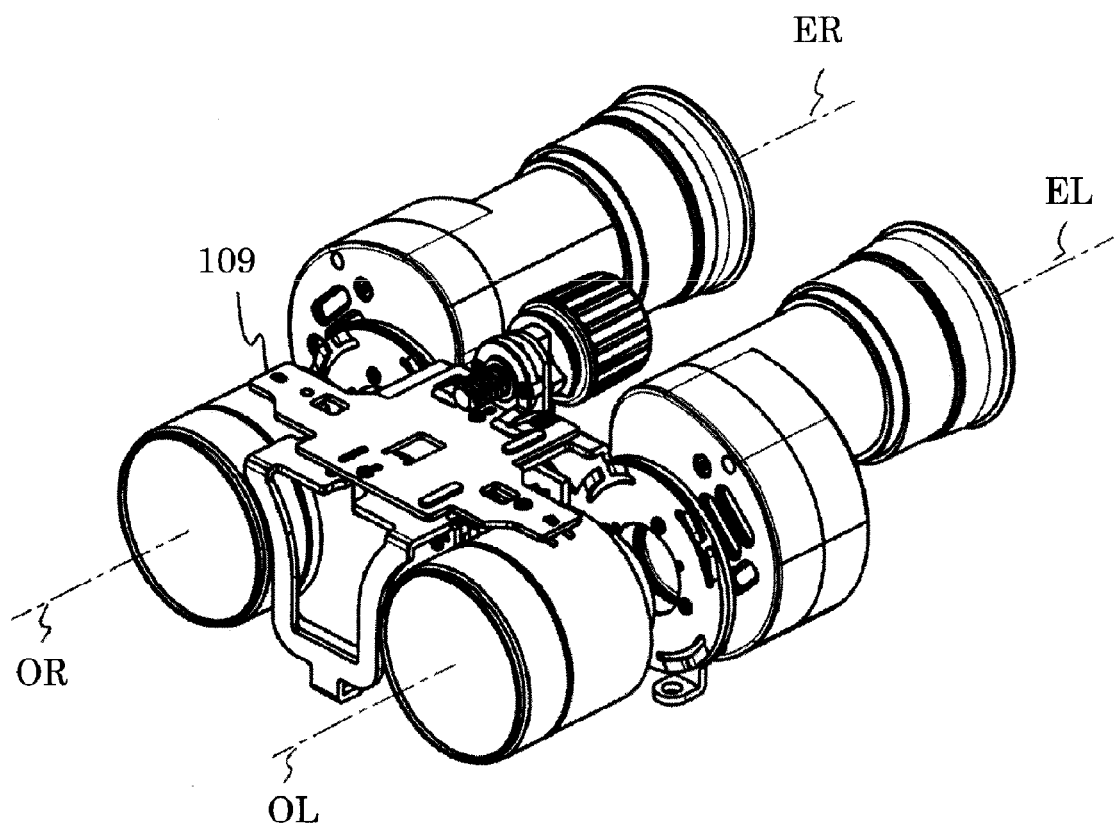
FIG. 13 is a perspective view of a pair of binoculars that is embodiment 2 of the present invention.

FIG. 13 shows a configuration of a pair of binoculars that is embodiment 2 of the present invention. The present embodiment is, as shown in FIG. 14, different in a drive mechanism which moves a focus support plate in an optical axis direction from embodiment 1.

In FIG. 13, reference symbol OL denotes an optical axis of a left objective optical system, reference symbol OR denotes an optical axis of a right objective optical system, reference symbol EL denotes an optical axis of a left eyepiece optical system, and reference symbol ER denotes an optical axis of a right eyepiece optical system. The configurations of these optical systems are the same as those of embodiment 1.

Reference numeral 109 denotes a focus support plate (first member) on which the left and right objective optical systems are fixed, and is basically the same as the focus support plate 9 of embodiment 1. Since the configurations other than the drive mechanism are the same as those of embodiment 1, the descriptions thereof will be omitted.

Figure 14:
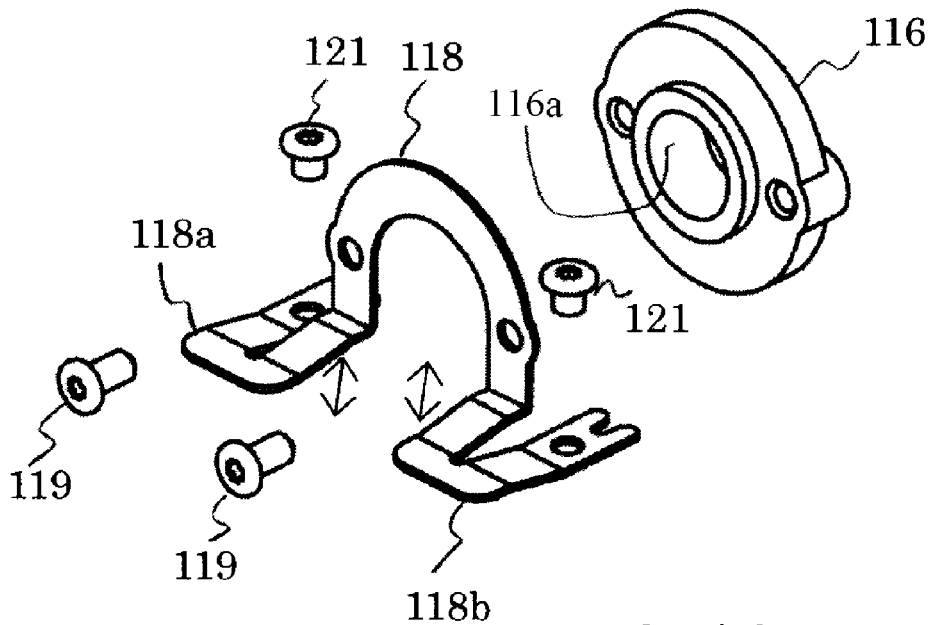
FIG. 14 is an exploded perspective view of a drive mechanism in embodiment 2.

In FIG. 14, reference numeral 116 denotes a nut as a driven member which has a female screw 116a screwed into (engaging with) the feed screw 13 described in embodiment 1. Reference numeral 118 denotes a nut biasing spring as a connection member. The nut 116 is fixed on a rising portion of a half-arc shape of the nut biasing spring 118 by two screws 119. Leg portions 118a and 118b are formed at the left and right of the nut biasing spring 118, and the leg portions 118a and 118b are fixed on the upper surface of the focus support plate 109 by two screws 121.

The nut biasing spring 118 is formed like the following shape, including the leg portions 118a and 118b. In other words, it has elasticity in an upward and downward direction and a left and right direction so that the nut 116 (female screw 116a) generates an appropriate elastic force (biasing force) in the upward and downward direction and the left and right direction (engagement direction) in which it engages with the feed screw 13. Further, in the optical axis direction that is an axis direction of the feed screw 13, it has rigidity higher than that in the engagement direction (the upward and downward direction and the left and right direction).

A driving force in the optical axis direction is generated by a screwing action between the feed screw 13 and the female screw 116a of the nut 116 in accordance with the rotational operation of the operational dial 14 shown in embodiment 1 to rotate the feed screw 13. The nut 116, the nut biasing spring 118, and the focus support plate 109 are moved in the optical axis direction by the driving force.

The position displacement between the feed spring 113 and the female spring 116a in an upward and downward direction is absorbed by elastically deforming the leg portions 118a and 118b of the nut biasing spring 118 in the same direction of the upward and downward direction. Further, the position displacement between the feed spring 113 and the female spring 116a in a left and right direction is absorbed by elastically deforming the leg portions 118a and 118b in directions opposite to each other of the upward and downward direction. Thus, similarly to embodiment 1, even if the relative position accuracy between the feed screw 13 and the nut 116 is not high, the increase of the frictional force generated by sliding the feed screw 13 on the female screw 116a can be prevented.

Embodiment 3

Figure 15:
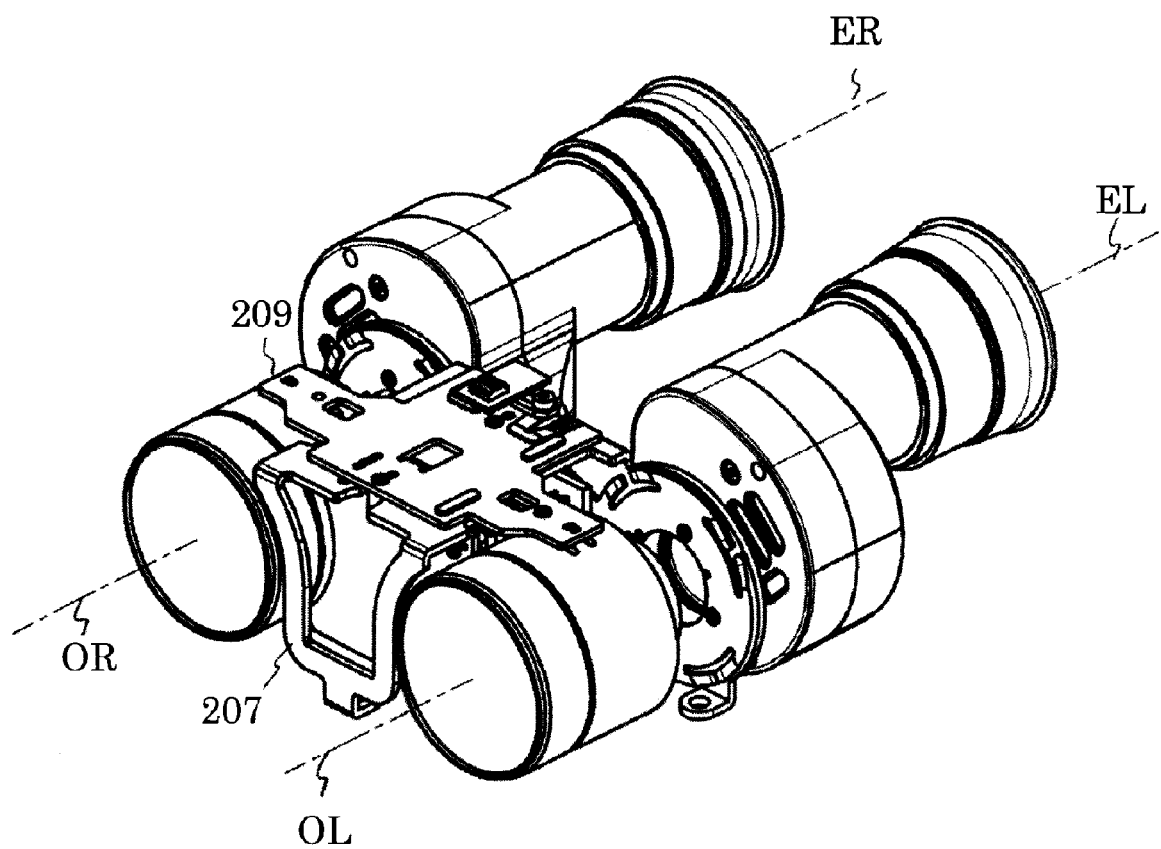
FIG. 15 is a perspective view of a pair of binoculars that is embodiment 3 of the present invention.

FIG. 15 shows a configuration of a pair of binoculars that is embodiment 3 of the present invention. The present embodiment is, as shown in FIG. 16, different in a configuration of a drive mechanism for moving a focus support plate in an optical axis direction from embodiments 1 and 2.

In FIG. 15, reference symbol OL denotes an optical axis of a left objective optical system, and reference symbol OR denotes an optical axis of a right objective optical system. Reference numeral EL denotes an optical axis of a left eyepiece optical system, and reference symbol ER denotes an optical axis of a right eyepiece optical system. The configurations of these optical systems are the same as those of embodiment 1.

Reference numeral 209 denotes a focus support plate (first member) on which left and right objective optical systems are fixed, and is basically the same as the focus support plate 9 of embodiment 1. Reference numeral 207 denotes a base member (second member) which holds the focus support plate 209 so as to be movable in the optical axis direction and attaches left and right eyepiece units, and is basically the same as the base member 7 of embodiment 1. Since the configurations other than the drive mechanism is the same as those of embodiment 1, the description thereof will be omitted.

Figure 16:
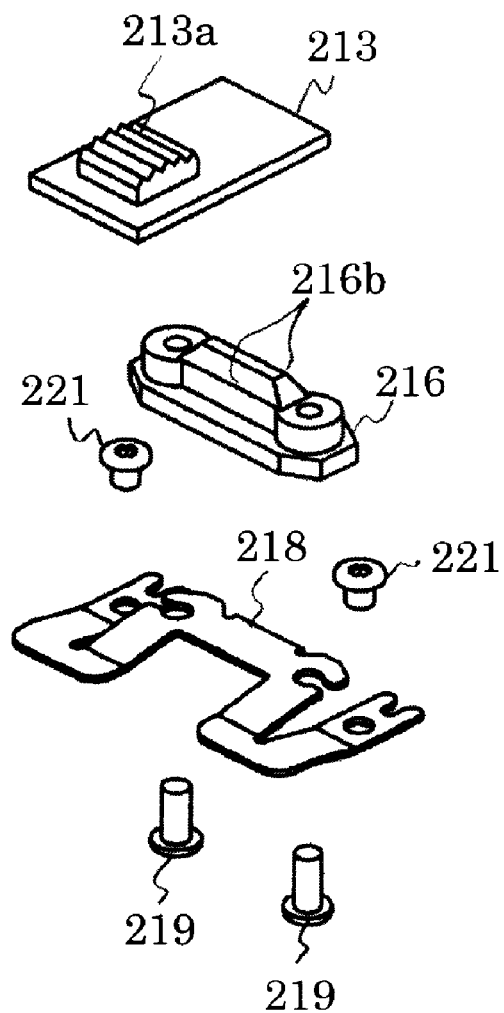
FIG. 16 is an exploded perspective view of a drive mechanism in embodiment 3.

In FIG. 16, reference numeral 216 denotes a driven piece as a driven member, and reference numeral 218 denotes a driven piece biasing spring as a connection member. The driven piece 216 is fixed on an upper end surface of the driven piece biasing spring 218 by two screws 219. The driven piece biasing spring 218 is fixed on an upper surface of the focus support plate 209 by two screws 221.

Figure 17:
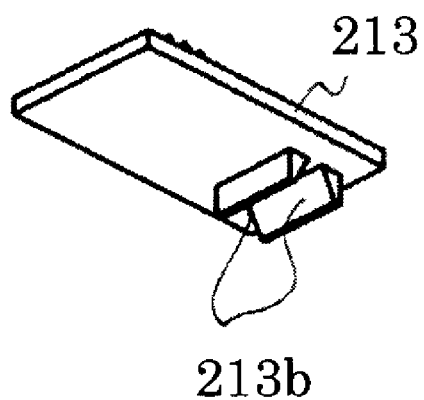
FIG. 17 is a perspective view of a slide knob used for a drive mechanism in embodiment 3.

Reference numeral 213 denotes a slide knob that is an input member. The slide knob 213 is supported by a rail formed at an inner surface side of an upper surface exterior member (not shown) of a pair of binoculars so as to be movable in the optical axis direction, and exposes a protrusion portion 213a having a shape in which it is easy for an observer to operate by his finger to an outside of the upper surface exterior member. The driven piece 216 has an inclined plane portion 216b. As shown in FIG. 17, an engagement portion 213b engaging with the inclined plane portion 216b is formed on a lower surface of the slide knob 213.

The driven piece biasing spring 218 is formed like the following shape. In other words, it has elasticity in an upward and downward direction so that the driven piece 216 (inclined plane portion 216b) generates an appropriate elastic force (biasing force) in the upward and downward direction including an upward direction (engagement direction) in which it engages with the slide knob 213 (engagement portion 213b). Further, in the optical axis direction that is an operation direction of the slide knob 213, it has rigidity higher than that in the engagement direction (or the upward and downward direction).

The driven piece 216, the driven piece biasing spring 218, and the focus support plate 209 move in the optical axis direction by the driving force in the optical axis direction generated by the slide operation of the slide knob 213.

The position displacement of the slide knob 213 in the left and right direction is absorbed by permitting the displacement of the engagement position with respect to the inclined plane portion 216b of the driven piece 216 of the engagement portion 213b. The position displacement of the slide knob 213 in the upward and downward direction is absorbed by elastic deformation of the driven piece biasing spring 218 in the upward and downward direction. Therefore, the relative position accuracy between the slide knob 213 and the driven piece 216 does not have to be high.

Embodiment 4

Figure 18:
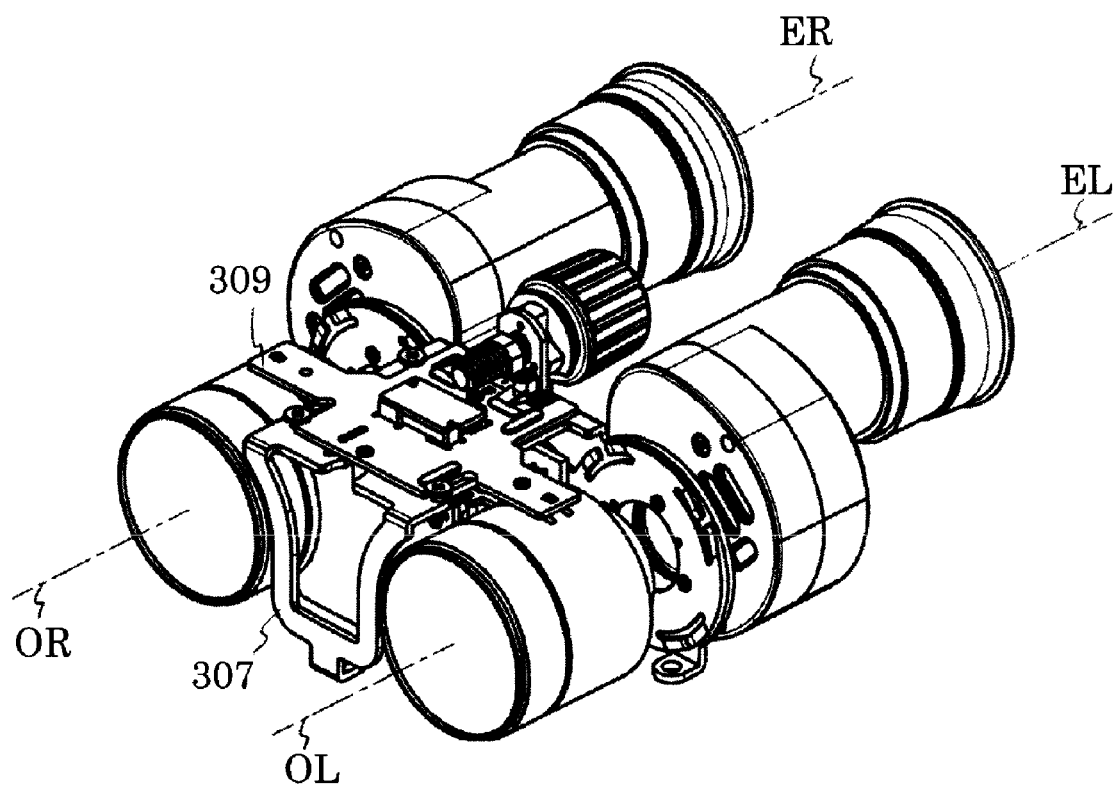
FIG. 18 is a perspective view of a pair of binoculars that is embodiment 4 of the present invention.

FIG. 18 shows a configuration of a pair of binoculars that is embodiment 4 of the present invention. The present embodiment is, as shown in FIG. 19, different in the configuration of a focus mechanism from embodiment 1.

In FIG. 18, reference symbol OL denotes an optical axis of a left objective optical system, and reference symbol OR denotes an optical axis of a right objective optical system. Reference symbol EL denotes an optical axis of a left eyepiece optical system, and reference symbol ER denotes an optical axis of a right eyepiece optical system. The configurations of these optical systems are the same as those of embodiment 1.

Reference numeral 309 denotes a focus support plate (first member) on which left and right objective optical systems are fixed. Reference numeral 307 denotes a base member (second member) which holds a focus support plate 309 via balls so as to be movable in an optical axis direction and to which left and right eyepiece units are attached. Since the configurations other than the focus mechanism are the same as those of embodiment 1, the description thereof will be omitted.

As shown in FIG. 19, similarly to embodiment 1, a guide portion (a guide groove portion) and a ball holding portion (a holding groove portion) are formed in the focus support plate 309 and a base plate portion 307F of the base member 307. Balls 10a, 10b, 10c, and 10d are held by the guide portion and the ball holding portion so as to be able to perform a rolling motion in the optical axis direction. The focus support plate 309 is, similarly to embodiment 1, supported via the balls 10a, 10b, 10c, and 10d so as to be movable in the optical axis direction in a state where a predetermined gap is formed with respect to the base plate portion 307F.

Reference numeral 311a denotes a rectangular magnet, and is magnetized so that the north pole and the south pole are arranged in the optical axis direction or in the left and right direction. Reference numeral 311b denotes a back yoke which is made of a ferromagnet in order to close magnetic flux of the magnet 311a. Reference numeral 309e denotes four positioning portions which are formed by bending up a part of the focus support plate 309, and perform a positioning of the magnet 311a and the back yoke 311b in the optical axis direction and the left and right direction.

The focus support plate 309 is made of a paramagnet which is not absorbed by the magnet 311a, for example copper alloy or an austenitic stainless steel such as SUS304. The magnetic flux of the magnet 311a disposed on the focus support plate 309 at a side of a plane opposite to the back yoke 311b forms a magnetic path in the base member 307, by forming the base member 307 using iron that is a ferromagnet. As a result, the magnetic flux generated from the magnet 311a passes through the inside of the closed magnetic path which is formed including the back yoke 311b and the base member 307. Therefore, the focus support plate 309 is magnetically strongly attracted (biased) for the base member 307 (base plate portion 307F).

Thus, the present embodiment makes a biasing force for clamping the balls 10a to 10d in the guide portion and the ball holding portion using a non-contact method which utilizes an attractive force acting on between a ferromagnet and a magnet. Therefore, as is the case where a biasing force is acted by the contact method like embodiment 1, a load for the movement of a focus support plate in an optical axis direction is not generated.

Reference numeral 312 denotes three step screws, each of which is screwed into a corresponding screw hole on the base plate portion 307F. A flange portion of the step screw 312 is disposed with a sight gap for the upper surface of the focus support plate 309 to prevent the focus support plate 309 from lifting or dropping off for the base plate portion 307F by an external force such as a shock.

According to each of the above embodiments, a large moving amount of a first optical element with a small space in an optical axis direction can be ensured. Further, an observation apparatus that has a good position accuracy of the first optical element to be moved and that has a small drive load can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in each of the above embodiments, a pair of binoculars with an anti-vibration function has been described, but the present invention is also applicable to a pair of binoculars which does not have the anti-vibration function. Further, in each of the above present embodiment, a focus mechanism in which a focusing is performed while left and right objective optical systems move in an optical axis direction, but the present invention is also applicable to a focus mechanism in which the focusing is performed while left and right eyepiece optical systems move in the optical axis direction.

The present invention may also fix a lens unit (first optical element) constituting a part of the left and right objective optical systems or eyepiece optical systems on a movable member (first member) to move the movable member with respect to a fixed member (second member) in an optical axis direction to have a variable magnification function.

In each of the above embodiments, the case where a drive mechanism that drives the focus mechanism is a manual operating mechanism has been described, but an electric mechanism using an electric actuator such as a motor or a linear actuator may also be used.

Further, in each of the present embodiment, a pair of binoculars which has a pair of observation optical systems (objective optical systems, erecting optical systems, and eyepiece optical systems) has been described, but the present invention is also applicable to an observation apparatus which has one observation optical system.

This application claims the benefit of Japanese Patent Application No. 2008-216448, filed on Aug. 26, 2008, which is hereby incorporated by reference herein in its entirety.

What is claimed is:

1. An observation apparatus comprising:
an observation optical system;
a first member configured to support a first optical element constituting a part of the observation optical system;

a second member configured to support a second optical element constituting another part of the observation optical system and to support the first member via a plurality of balls so as to be movable in an optical axis direction of the first optical element; and a biasing device configured to generate a biasing force for clamping the plurality of balls between the first member and the second member, wherein the plurality of balls include two first balls disposed at positions away from each other in the optical axis direction and a second ball disposed away from the two first balls in a direction orthogonal to the optical axis direction, wherein the first and second members include two guide portions which are configured to engage with corresponding one of the two first balls so as to permit a rolling motion of the two first balls in the optical axis direction and prevent a displacement of the first member with respect to the second member in the direction orthogonal to the optical axis direction, and a ball holding portion which is configured to hold the second ball so as to permit a rolling motion of the second ball in the optical axis direction, wherein the two guide portions are configured by grooves which are provided in the first and second members and extend in an optical axis direction, and widths of the grooves in a direction orthogonal to the optical axis direction are shorter than a diameter of the first ball, and wherein the ball holding portion includes a groove portion which is provided in one of the first and second members and extends in the optical axis direction, and a plane portion which is provided in the other and has a width greater than a diameter of the second ball in a direction orthogonal to the optical axis direction.

2. The observation apparatus according to claim 1, wherein the observation optical system includes a pair of observation optical systems, wherein the first member supports a pair of the first optical elements which constitute a part of each of the pair of observation optical systems, and wherein the second member supports a pair of the second optical elements which constitute another part of each of the pair of observation optical systems.

3. The observation apparatus according to claim 1, wherein a drive unit configured to move the first member with respect to the second member in the optical axis direction includes a connection member connected to the first member, a driven member fixed on the connection member, and an input member engaging with the driven member, and generates a driving force in the optical axis direction in accordance with a motion of the input member, and wherein the connection member generates an elastic force in an engagement direction in which the driven member engages with the input member, and has rigidity in the optical axis direction higher than that in the engagement direction.

4. The observation apparatus according to claim 1, wherein a distance from a center of the first ball to a position where the first ball contacts the groove portion of the first member of one of the two guide portions is equal to a distance from the center of the first ball to a position where the first ball contacts the groove portion of the second member of one of the two guide portions, and a ratio of a distance from a center of the second ball to a position where the second ball contacts the groove of the ball holding portion and a distance from the center of the second ball to a position where the second ball contacts the plane portion is 1:2.

5. An observation apparatus comprising:

an observation optical system;

a first member configured to support a first optical element constituting a part of the observation optical system;

a second member configured to support a second optical element constituting another part of the observation optical system and to support the first member via a plurality of balls so as to be movable in an optical axis direction of the first optical element; and a biasing device configured to generate a biasing force for clamping the plurality of balls between the first member and the second member, wherein the plurality of balls include two first balls disposed at positions away from each other in the optical axis direction and a second ball disposed away from the two first balls in a direction orthogonal to the optical axis direction, wherein the first and second members include two guide portions which are configured to engage with corresponding one of the two first balls so as to permit a rolling motion of the two first balls in the optical axis direction and prevent a displacement of the first member with respect to the second member in the direction orthogonal to the optical axis direction, and a ball holding portion which is configured to hold the second ball so as to permit a rolling motion of the second ball in the optical axis direction, wherein the two guide portions are configured by grooves which are provided in the first and second members and extend in an optical axis direction, and widths of the grooves in a direction orthogonal to the optical axis direction are shorter than a diameter of the first ball, wherein the ball holding portion includes a groove portion which is provided in one of the first and second members and extends in the optical axis direction, and a plane portion which is provided in the other and has a width greater than a diameter of the second ball in a direction orthogonal to the optical axis direction, and wherein the biasing device is disposed at a side opposite to the first member with respect to the second member, and includes an elastic member connected to the first member and a third ball disposed so as to be able to perform a rolling motion in the optical axis direction between the elastic member and the second member.

6. The observation apparatus according to claim 5, wherein the third ball is provided so that a gap is formed between the third ball and the first member or the second member.

* * * * *